(12) United States Patent
Kilaas et al.

(10) Patent No.: US 6,672,385 B2
(45) Date of Patent: Jan. 6, 2004

(54) COMBINED LINER AND MATRIX SYSTEM

(75) Inventors: Lars Kilaas, Trondheim (NO); Are Lund, Trondheim (NO); Davoud Tayebi, Trondheim (NO); Jostein Sveen, Trondheim (NO); Arne Lund Kvernheim, Nesoddtangen (NO); Marit Valeur Ramstad, Trondheim (NO); Odd Ivar Eriksen, Oslo (NO); Ole Bernt Lile, Trondheim (NO); Ole Widar Saastad, Oslo (NO)

(73) Assignee: Sinvent AS, Trondheim (NO)

( * ) Notice: Subject to any disclaimer, the term of this patent is extended or adjusted under 35 U.S.C. 154(b) by 0 days.

(21) Appl. No.: 09/908,636

(22) Filed: Jul. 20, 2001

(65) Prior Publication Data

US 2002/0020527 A1 Feb. 21, 2002

(30) Foreign Application Priority Data

Jul. 21, 2000 (NL) .......................................... 2000-3777
Aug. 18, 2000 (NL) .......................................... 2000-4130
Mar. 27, 2001 (NL) .......................................... 2001-1569

(51) Int. Cl.⁷ .......................... E21B 43/08; E21B 117/00
(52) U.S. Cl. .................. 166/250.01; 166/276; 166/228; 166/242.4
(58) Field of Search ................... 166/250.01, 250.05, 166/278, 277, 276, 51, 227, 228, 230, 242.1, 242.4

(56) References Cited

U.S. PATENT DOCUMENTS

| | | | | |
|---|---|---|---|---|
| 4,660,645 A | * | 4/1987 | Newlove et al. ............ | 166/279 |
| 4,670,166 A | | 6/1987 | McDougall et al. | |
| 4,705,809 A | | 11/1987 | Dighton et al. | |
| 4,738,897 A | * | 4/1988 | McDougall et al. ........ | 252/180 |
| 4,875,525 A | | 10/1989 | Mana | |
| 5,004,049 A | * | 4/1991 | Arterbury ................... | 166/228 |
| 5,050,678 A | | 9/1991 | Gaidry et al. | |
| 5,088,554 A | * | 2/1992 | Arterbury et al. .......... | 166/228 |
| 5,150,753 A | * | 9/1992 | Gaidry et al. ............... | 166/228 |
| 5,190,102 A | * | 3/1993 | Arterbury et al. .......... | 166/228 |
| 5,355,956 A | * | 10/1994 | Restarick .................... | 166/229 |
| 5,551,513 A | | 9/1996 | Surles et al. | |
| 5,656,176 A | * | 8/1997 | Scott .......................... | 166/276 |
| 5,893,416 A | | 4/1999 | Read | |
| 6,092,604 A | * | 7/2000 | Rice et al. .................. | 166/378 |
| 6,305,468 B1 | * | 10/2001 | Broome et al. ............. | 166/230 |
| 2002/0007970 A1 | * | 7/2001 | Terry et al. ................. | 175/92 |

FOREIGN PATENT DOCUMENTS

| | | |
|---|---|---|
| GB | 2 263 714 | 8/1993 |
| WO | 85/02443 | 6/1985 |
| WO | 98/40606 | 9/1998 |

* cited by examiner

Primary Examiner—David Bagnell
Assistant Examiner—Jennifer H Gay
(74) Attorney, Agent, or Firm—Wenderoth, Lind & Ponack L.L.P.

(57) ABSTRACT

The invention relates to a system and a method for well completion, control and monitoring of processes in a reservoir. A combined prefabricated liner and matrix system (4) with defined properties for fast and simple well and/or reservoir completion, monitoring and control is provided. An embodiment of the combined prefabricated liner and matrix system 4 includes an outer perforated tubular pipe system 6, an inner tubular screen 7, and a matrix 8. A method for control and monitoring of processes in a well or reservoir using the combined liner and matrix system is also described. The combined liner/matrix system may be used in any process equipment, such as reactors, separators and storage tanks. The system may also be used in a gas/oil/water producing or injection well for well completion, control and monitoring.

25 Claims, 10 Drawing Sheets

FIGURE 18

COMBINED LINER AND MATRIX SYSTEM

FIELD OF THE INVENTION

The invention relates to a system and a method for well completion, control, and monitoring of processes in a reservoir. Uses of the system and method are also disclosed.

BACKGROUND OF THE INVENTION

In many wells, the hydrocarbon-bearing formation has to be stabilized from collapse of the well bore or cracks around the well bore. Another reason to stabilize a well bore is to reduce the production of fine materials like sand. In order to attain this, the bore is often lined with a perforated steel pipe, and the space between the bore and the pipe may be packed with gravel or proppant particles as described in WO9954592. In addition, different kinds of sand filters (gravel or matrixes) may be placed inside (U.S. Pat. No. 5,893,416, U.S. Pat. No. 5,232,048 and U.S. Pat. No. 5,551,513) the steel pipe a liner.

Usually, during hydrocarbon production a minimum amount of water production (compared to oil or gas) is desirable. This is normally achieved by using techniques to suppress water flooding into the reservoir by altering the production zones or by blocking water breakthrough. For sub sea wells, separation techniques have been attempted to accomplish separation of water produced down in the well bore (downhole), along with reinjection of the produced water. For example, electric powered centrifugal separators have been positioned downhole to generate a fluid separation vortex within the downhole separator. Another solution is to install systems of valves and bypass pipelines in the well bore in order to bypass water production zones (WO9963234). However, such equipment requires power and moving components subject to wear and failure. In U.S. Pat. No. 6,015,011, a downhole separation technique including adjusting the pressure differential across a filter below a packer is described. Other methods proposed to reduce water production in a well includes water sensitive gels (U.S. Pat. No. 5,609,209), water sensitive particles (WO9954592), or microorganisms in porous particles (WO9936667) placed in gravel packing or reservoir fractures. In U.S. Pat. No. 6,015,011, a downhole separation technique involving adjusting the pressure differential across a filter below a packer is described.

In order to optimize the total production of oil and gas from a well, some production zones in a well bore may have to be bypassed or sealed off for a given time. This can be achieved by completing the zones with a cemented liner, which is penetrated mechanically at a later time by intervention. Another solution is to install systems of valves and bypass pipelines in the wellbore in order to bypass given production zones (WO9963234). However, such equipment requires power and moving components subject to wear and failure.

It is also desirable to be able to monitor production and different phenomena, such as local variations in pH, salinity, hydrocarbon composition, temperature, pressure, microorganisms, and the difference between production of formation and/or injection water. A known method for monitoring local flow properties in a well is to lower a logging tool into the well as described in U.S. Pat. No. 4,861,986, U.S. Pat. No. 5,723,781 and U.S. Pat. No. 5,811,807. These tools require power and moving components subject to wear and failure. Another method for monitoring the flow is by chemical tracers injected (U.S. Pat. No. 4,420,565 and U.S. Pat. No. 4,264,329) or placed in solid particle packs placed along the well bore (U.S. Pat. No. 3,991,827 and U.S. Pat. No. 4,008,763). Injection of radioactive isotopes is described in U.S. Pat. No. 5,892,147. NO-C-309884 (belonging to the present applicant) describes methods for chemically immobilizing or integrating tracers in the formation, construction, or filters around the well. The tracers or tracer carriers are chemically intelligently released as a function of specified events, such as oil or water flow rates.

The object of the present invention is to provide a new solution for low cost, fast and simple well or reservoir completion enabling long time monitoring and enhanced production from hydrocarbon wells without any needs for power or moving components.

SUMMARY OF THE INVENTION

In accordance with a first aspect, the invention provides a combined prefabricated liner and matrix system comprising an outer perforated pipe system having sufficient strength to work as a liner and/or a sand screener, an inner screen, and a matrix arranged between the outer pipe and inner screen. The combined liner and matrix system constitute a prefabricated liner with predefined properties for fast and simple well and/or reservoir completion, monitoring and control.

The matrix may be porous with a controllable porosity, pore size and pore size distribution, and the porosity and hence the permeability may be automatically affected by the environment, e.g. by water or oil flow, or by manual triggering with specific reagents. These may be added by the use of well known techniques or via injection wells. The matrix is either a bulk form (uniform) type having the same shape as the geometrical volume filled by a monomer/polymer solution prior to polymerization, a package of at least one type of polymer particle, or a combination of polymer particles in a bulk polymer (matrix). The matrix may also comprise an inert or porogen medium or compound. As is known in the art, a porogen is an inert substance (such as a solvent) that occupies a certain volume of a matrix. After a chemical reaction (such as a polymerization reaction) occurs, removal of the substance by, for example, washing and evaporation/drying will create pores in the matrix element. It is also possible to start with an initially compact matrix that becomes porous and permeable as a result of external influence. Both an initially porous and compact matrix may comprise a polymer or chemical compound reacting at the ambient conditions (e.g. temperature, pH, water or triggers), thereby releasing substances chemically bonded or bonded by adsorption to the matrix into the fluid flow.

The matrix may further comprise components that are detectable after release from the matrix, e.g. a chemically intelligent tracer(s) for monitoring, production and/or specific events in the well or reservoir. The tracers may be adsorbed in or chemically bonded to the matrix.

In accordance with a second aspect, the invention provides a method for control and monitoring of processes in a well or reservoir using the combined liner and matrix element system as described above. In particular, the method includes providing the combined liner and matrix element system containing a matrix with certain properties based on reservoir data prior to installation in the reservoir installing the combined liner and matrix element system in the reservoir, and controlling or monitoring the well by interaction with/by means of the matrix.

In accordance with a third aspect of the invention, the above combined liner and matrix system may be used as a combined pipeline in any process equipment, such as reactors, separators and storage tanks.

The liner and matrix element system of the present invention provides a fast and simple method for well completion, control and monitoring of processes preferably to be used in any oil, gas or water production or injection well. In a well, completion parts of the series of elements may be unperforated pipe elements. The matrix may further comprise components inhibiting or preventing any unwanted phenomena, such as bacteria growth or scale formation in the matrix.

The invention may be used in any kind of well bore onshore or offshore. It may also be used for similar purposes in any process equipment.

BRIEF DESCRIPTION OF DRAWINGS

The above and further advantages may be more fully understood by referring to the following description and accompanying drawings described below.

DETAILED DESCRIPTION OF THE INVENTION

The following description of different embodiments of the invention is intended to be for example only, and must not be used as limiting for the invention.

Figure 1:
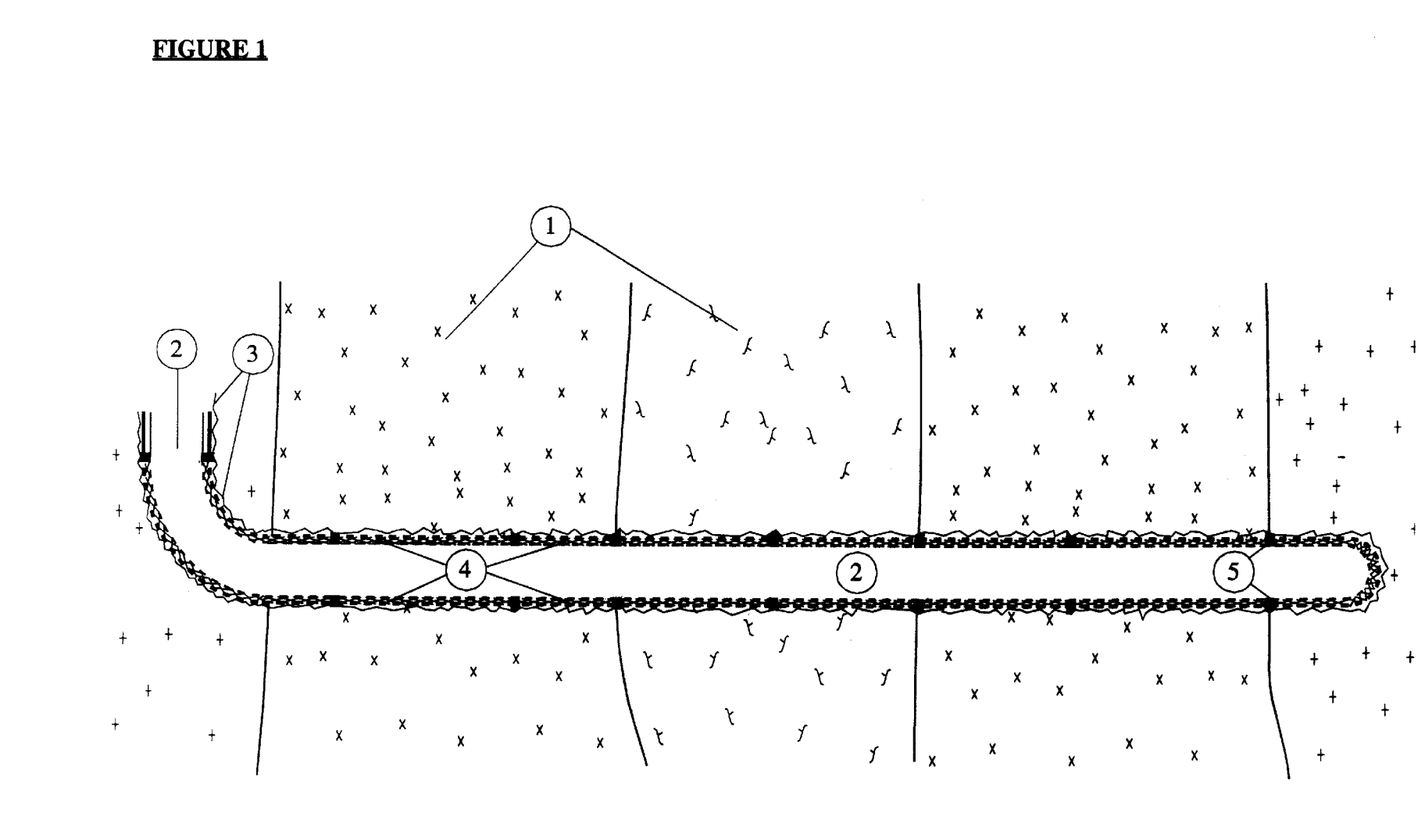
FIG. 1 shows a schematic drawing of a well bore through different formation layers in a reservoir.
Figure 2:
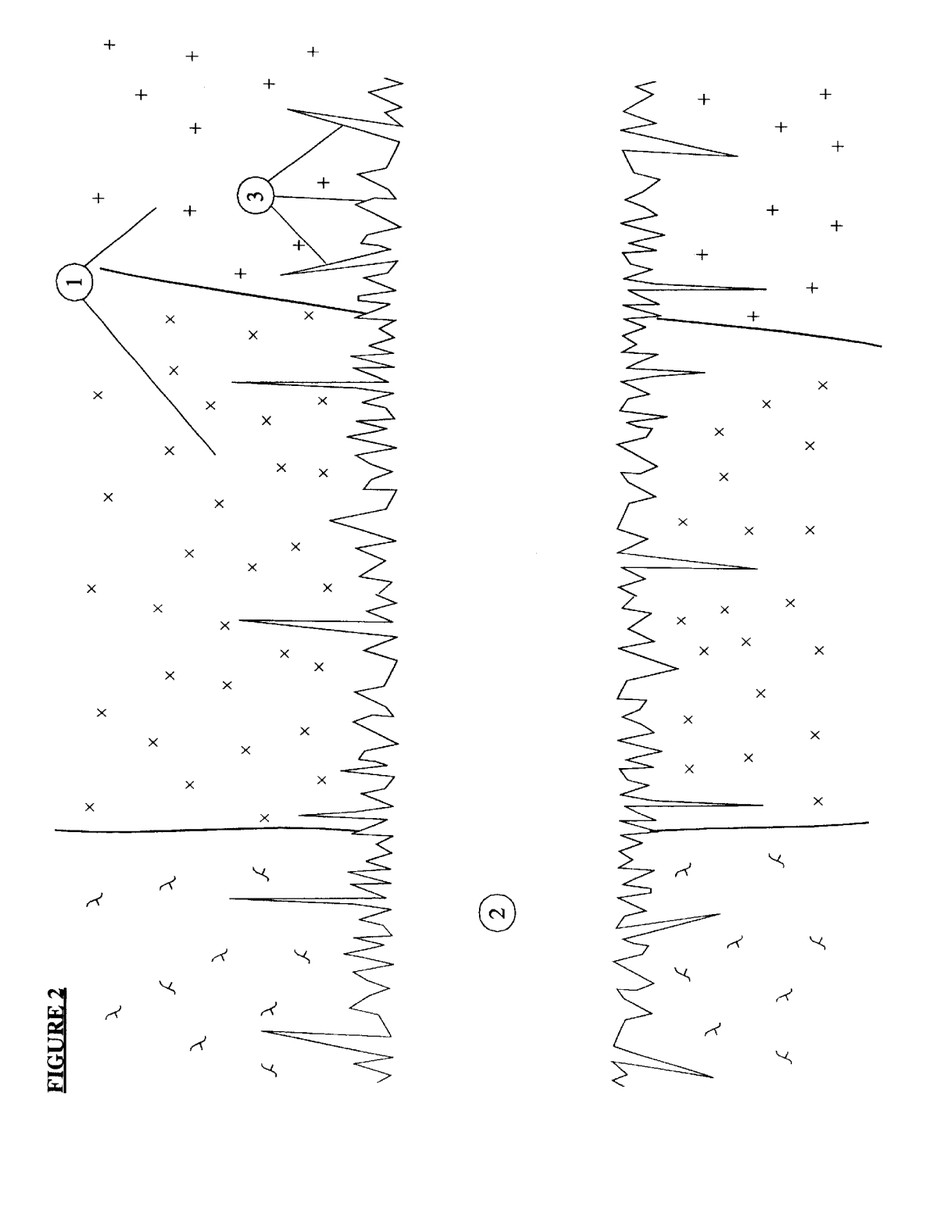
FIG. 2 is a schematic drawing of an arbitrary section of a well bore in a reservoir before insertion of any liner and matrix element system. The well bore boundary and the fractures in the reservoir formation are also indicated on the figure.
Figure 6:
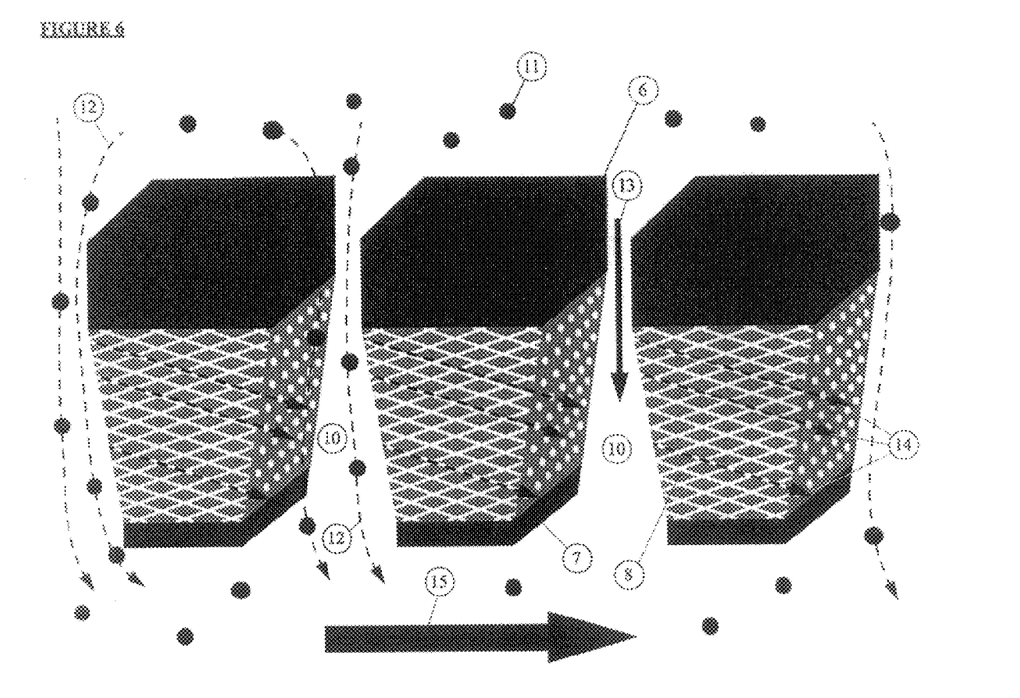
FIG. 6 is a schematic cross wall drawing of a possible design for a combined liner and matrix element system according to an embodiment of the invention.

As will be clear from the following description, the terms "inner" and "outer" are to be defined with respect to the central longitudinal axis of the system 4. In other words, "inner" means closer to the central longitudinal axis, while "outer" means farther from the central longitudinal axis. The combined prefabricated liner and matrix element system 4 preferably to be used in an oil, gas or water producing or injection well 2, is shown in FIG. 1. The wellbore boundary 3 through formation layers of reservoir 1 is indicated on the figure. The prefabricated combined liner and matrix element system 4 is inserted into the well bore 2, and may be fabricated in various lengths, strengths, and with different properties. The well can be divided in sections or regions using a plugging system 5. The locations of the plugging system elements may be predetermined, for example, based on reservoir data. It can also be based on other types of data or experiences. In one embodiment (FIG. 3) the combined liner and matrix element system 4 comprises several elements, each element consisting of an outer perforated pipe system 6 of sufficient strength to work as a liner and/or sand screen, an inner tubular screen 7, and a matrix 8 between the pipe system 6 and tubular screen 7. The matrix 8 is based on one or several types of polymer or polymer particles that may have one or several given sizes giving a desired characteristic/property to the matrix. The matrix 8 has any desired strength and permeability. The polymer particles in matrix 8 may, in addition, be carriers for any desired chemical or microorganism for control and/or monitoring purposes. The permeability of the matrix 8 is predetermined and may vary from zero to 70%, and the permeability may be fixed or vary in time according to oil or water flow rates, predetermined time degradation or sealing, or by chemical triggering. As shown in FIG. 6, predetermined holes or slices 10 through matrix 8 and inner screen 7 provides at full open areas nearly free flow of fluids from perforated pipe system 6. In order to improve (enhance) free unrestricted flow of fluids from perforated pipe system 6, an inner screen 16 may be placed between the pipe system 6 and matrix 8. Locations of the holes or slices 10 are predetermined, and may be fixed or vary in time according to oil or water flow rates. The holes or slices (apertures) 10 may be filled with an inert medium prior to installation in well 2, which degrade in a predetermined time at reservoir conditions or by chemical triggering. Decrease of open area trough hole or slices 10 may be obtained by swelling of the matrix 8.

The tubular liner and matrix element system 4 as shown in FIG. 1 may be prefabricated in sections at any suitable length and connected to each other or to any other pipeline elements in order to form a pipeline easily installed in horizontal, vertical or helical wells. The properties of the matrix 8 and shapes, sizes and numbers of holes or slices (apertures) 10 through matrix 8 may be predetermined from reservoir data and may vary with regard to length. Each element 4 may be tested before installation in the reservoir. Any element may contain equipment for mechanical or chemical sealing of the well bore.

The combined liner and matrix elements system 4 may be produced of any suitable materials having sufficient strength and desired properties. The inner diameter or the free space inside an element must be sufficient for free flow of any fluids and for handling of any necessary well tools like measuring equipment or valves.

The outer perforated pipe system 6 may be of a construction having sufficient strength to work as a liner and/or sand screener alone or as an integrated part of the combined liner and matrix element system 4, and may be of any metal, polymer or composite material. The outer tubular pipe system 6 may be formed as a single perforated pipe or as a flexible material net or any combinations hereof, and may be any commercial liner or sand screen elements.

Figure 3:
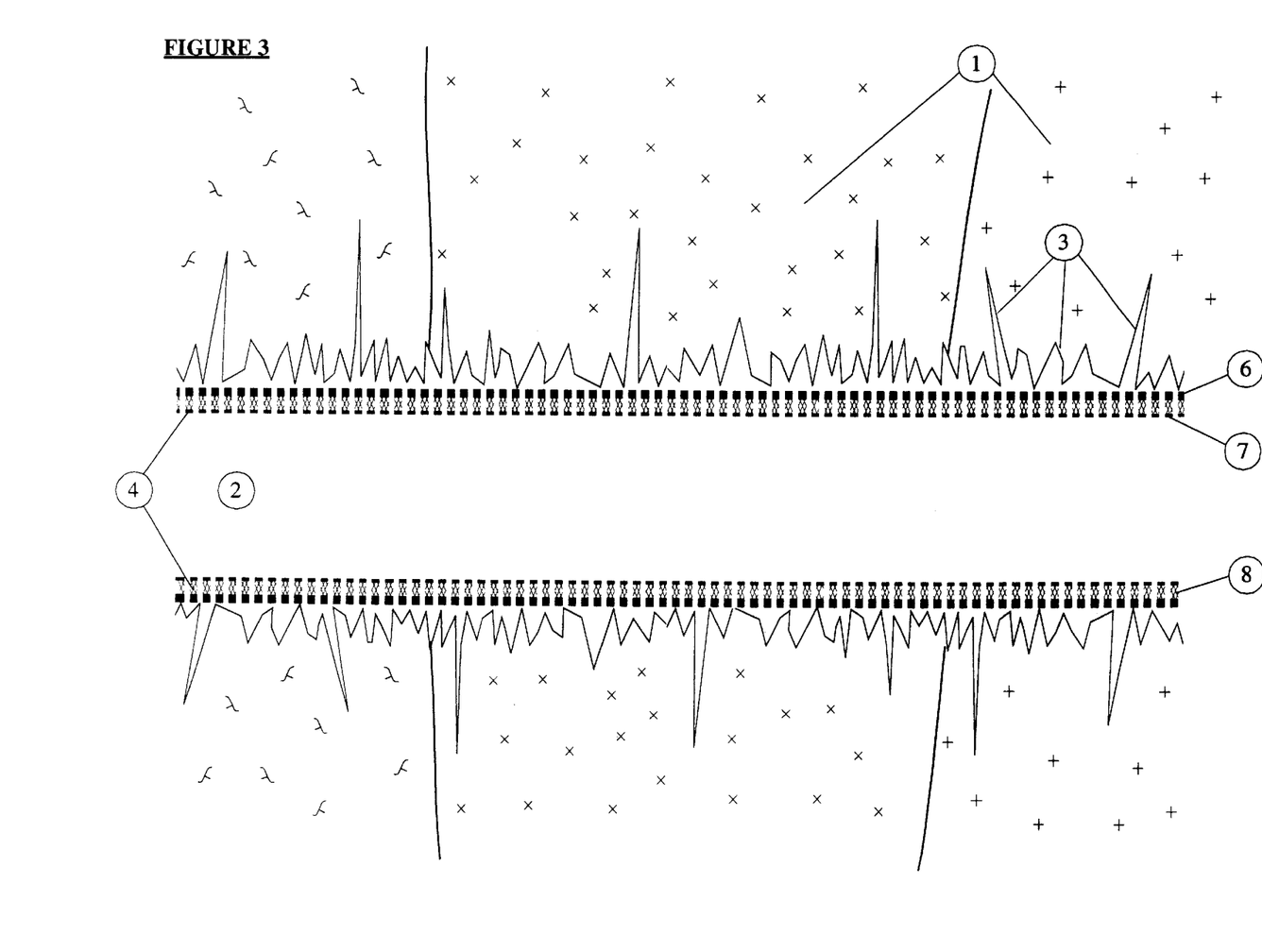
FIG. 3 is a schematic drawing of an arbitrary section of a well bore in a reservoir after insertion of a combined liner and matrix element system according to an embodiment of the invention.

The inner screen 7 may be of sufficient mechanical strength to handle any flow or well tool inside the elements (central well hole 2), and be an integrated part of the liner and matrix element system 4. The inner screen 7 may be of any metal, polymer or composite material. It may be formed as a single perforated pipe or as a flexible material net. The outer perforated tubular pipe system 6, the inner screen 7, and the matrix 8 are shown in FIG. 3.

Figure 4:
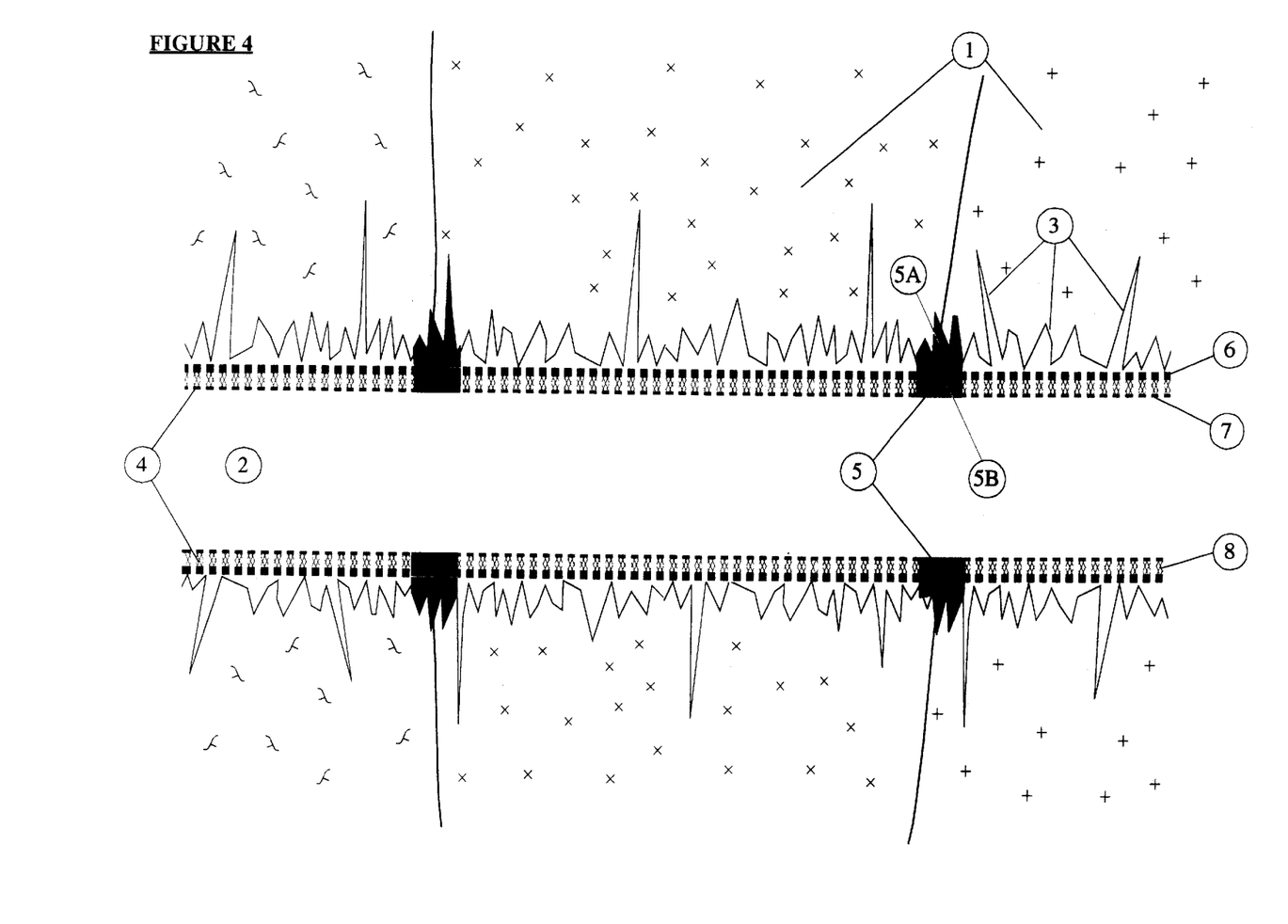
FIG. 4 is a schematic drawing of an arbitrary section of a well bore in a reservoir after insertion of a combined liner and matrix element system, in which the well is divided into sections according to an embodiment of the invention.

In FIG. 4, the well bore 2 and the combined liner and matrix element system 4 are divided into three separate sections or zones by plugging system components 5. The combined liner and matrix element system 4 used in various sections of the well may have different properties, lengths and strength. The injection or squeezing of the plugging system components 5 may be made after the insertion of the combined liner and matrix element system 4 into the wellbore 2.

Figure 5:
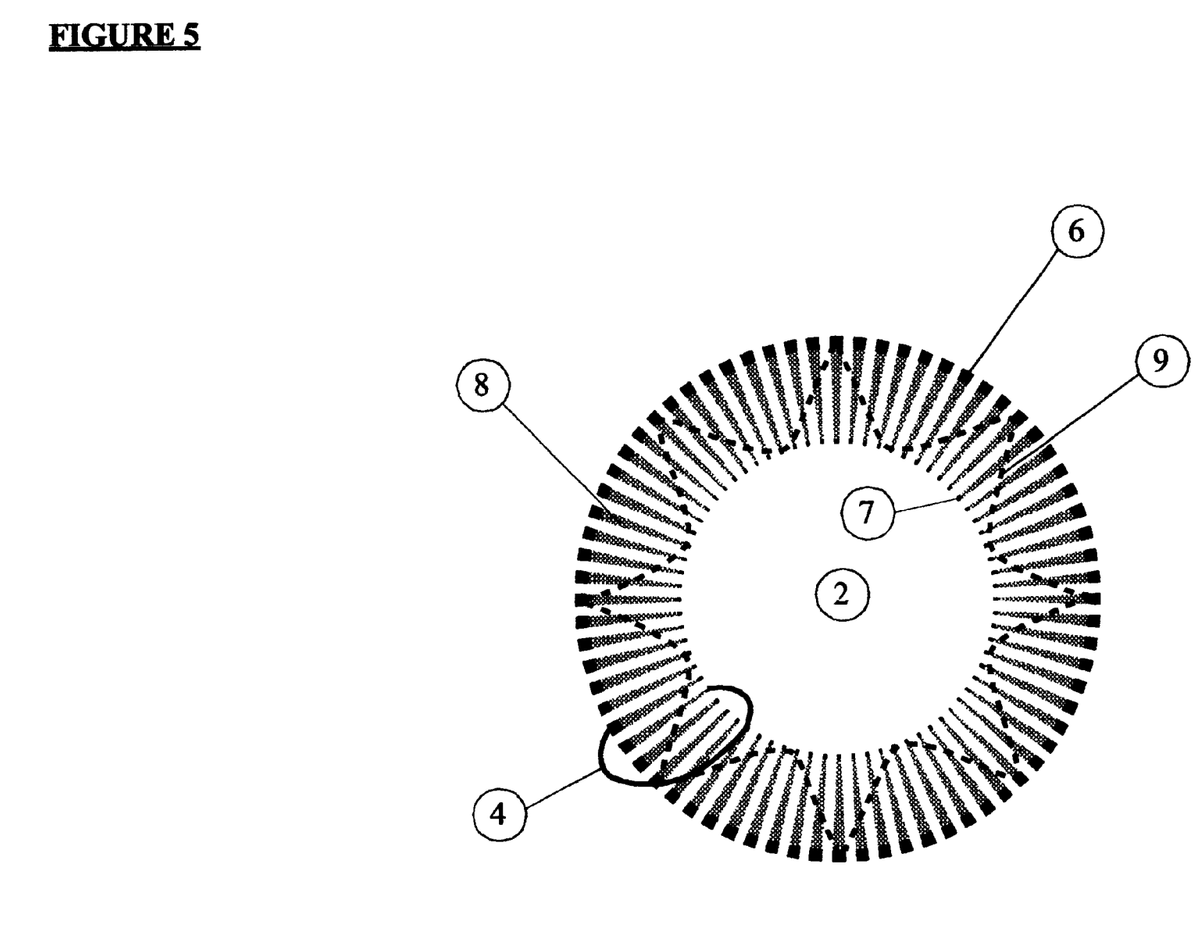
FIG. 5 is a schematic drawing of a possible structure design for the cross section of a combined liner and matrix element system according to an embodiment of the invention, in which a flexible perforated material between outer tube and inner screen forms a part of the combined liner and matrix element.

In the invented combined liner and matrix element system 4, the space between the outer perforated pipe system 6 and inner screen 7 is filled with a matrix 8 having any desired property. The matrix 8 may fill the space alone or be a part of the combined liner and matrix element system 4, as illustrated in FIG. 5, in which a flexible perforated material 9 between outer perforated pipe system 6 and inner screen 7 forms a part of the combined liner/matrix element 4. The flexible material 9 may be any metal or polymer material. Material 9 may be used in order to increase the physical strength and stability of matrix element system 4. As material 9 is perforated, it will not have any significant influence on fluid flow through matrix 8 or through holes or slices 10 through matrix 8.

In one embodiment, holes or slices 10 through matrix 8 and inner screen 7 gives free flow to any fluid 12 and/or fine particles 11 (e.g. sand) passing through outer tubular screen 6. This is shown in FIG. 6. A small portion 14 of any fluid 12 is drained through the porous matrix 8 by a pressure gradient due to fluid streams 12 and 15 and different sizes or geometric shapes of the holes or slices 10. The fluid flow 14 through matrix 8 enables any tracer incorporated into the matrix 8 to be released to the fluid stream 12 and thereafter to fluid stream 15 as disclosed in Norwegian patent NO-C-309884, or to activate control functions like swelling of matrix 8 when exposed to water for a given time. The inner screen 7 protects the matrix 8 from erosion due to fluid flow 15, and it prevents the fluid flow 15 from washing out the tracer from matrix 8 along its way out to the surface. This is an important issue since the release of tracers from matrix 8 indicates the local fluid flow rate from each section as described in Norwegian patent NO-C-309884.

Figure 7:
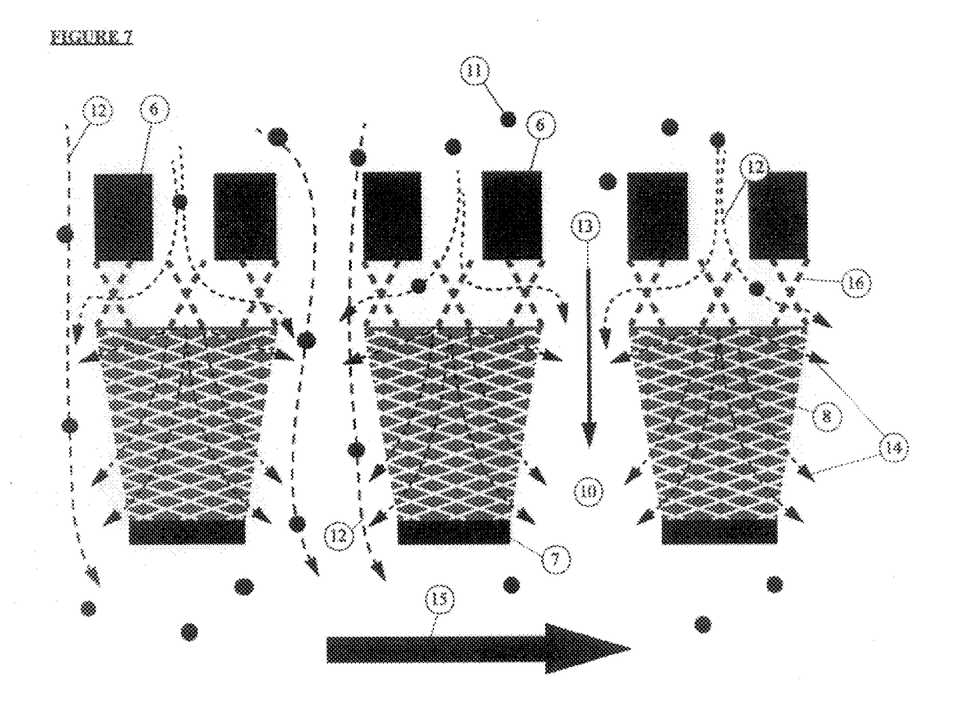
FIG. 7 is another schematic cross wall drawing of a possible design for a combined liner and matrix element system according to an embodiment of the invention.

FIG. 7 shows another schematic cross wall drawing of a possible design for a combined liner and matrix element system 4, including holes or slices 10 through matrix 8 and inner screen 7. A highly porous material or screen 16 of any metal, polymer or composite material is arranged between outer screen 6 and matrix 8, allowing free flow for any fluid stream 12 and/or fine particles 11 (e.g. sand) passing through outer tubular screen 6. A small portion 14 of any fluid stream 12 is drained through the porous matrix 8 by a pressure difference created by fluid streams 12 and 15 and different sizes or geometric shapes of the holes or slices 10, enabling any tracer to be released to fluid stream 12 according to the mechanisms described in Norwegian patent NO-C-309884, or to activate control functions like swelling of matrix 8 when exposed to water for a given time. In this case, the inner screen 7 also protects the matrix 8 from erosion due to fluid flow 15, and it prevents the fluid flow 15 from washing out the tracer from matrix 8 along its way out to the surface. This is an important issue since the release of tracers from matrix 8 indicates the local fluid flow rate from each section as described in Norwegian patent NO-C-309884.

Figure 10:
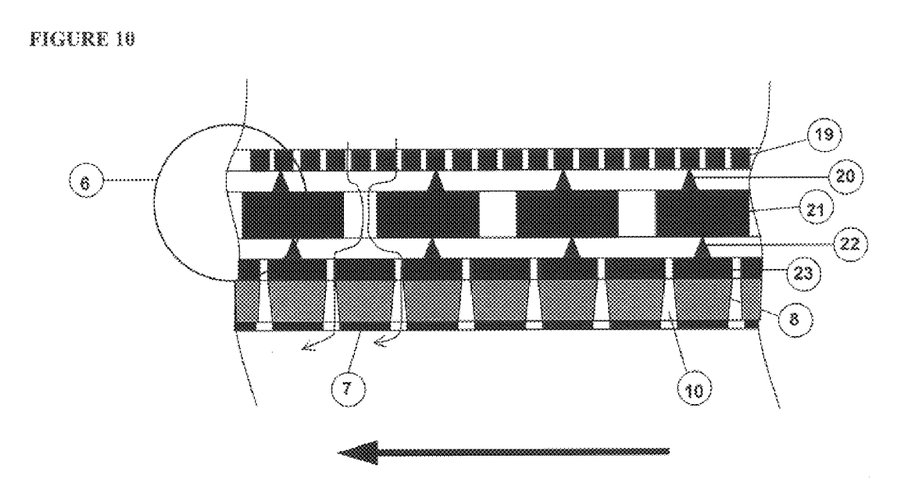
FIG. 10 is a schematic drawing of another combined liner and matrix element system according to an embodiment of the invention, in which the outer perforated pipe system consists of an outer sand screen, a spacer, a perforated pipe, a spacer, and a perforated pipe.

Perforated pipe system 6 may in principle be any combination of perforated pipes, spacers and flexible material nets working as a combined liner and/or sand screener. FIG. 10 shows an embodiment in which perforated pipe system 6 is formed by an outer flexible material layer 19 working as a sand screener, an outer perforated pipe 21, and an inner perforated pipe 23. Between outer flexible material 19 and perforated pipe 21, and between perforated pipe 21 and perforated pipe 23 are spacers 20 and 22. Spacers 20 and 22 allow free flow of any fluid and/or fine particles coming through flexible material 19 alongside perforated pipes 21 and 23. Outer flexible material 19, spacer 20 and outer perforated pipe 21 may be formed by any commercial combined liner and sand screen system. Perforating holes through pipe 21 may be of any shape, number or size, while perforating holes through pipe 23 are aligned with holes or slices through matrix 8 and inner screen 7 as indicated for pipe system 6 in FIGS. 6 and 7. Perforating holes in pipe 23 and holes or slices 10 through matrix 8 and inner pipe 7 may be made in any way to prevent direct fluid flow through perforating holes in both pipes 21 and 23. Outer flexible material 19, perforated pipes 21 and 23 and spacers 20 and 22 may be of any material, polymer or composite material.

Matrix

An important concept in the present invention is accurate control of the matrix porosity and the chemical composition. The matrix 8 is made by filling the specific volume (bulk) with reagents that can react to produce a porous polymer with the same shape as the free accessible volume. The porogen (often an inert solvent or polymers) is used to introduce pores in the polymer matrix. The type and amount of porogen will influence the pore sizes and the degree of porosity. Evaporation or degradation of the porogen leads to permanent porous matrixes. The matrix 8 may also consist of a bulk matrix as mentioned above combined with one or several types of prefabricated polymer particles. In this case, the polymer particles are mixed with the monomer(s) or reagents prior to the polymerization. During the polymerization process, these particles are evenly distributed throughout the whole volume of the matrix. The physical and chemical properties (e.g. porosity, pore size, degradability, swelling) are the same for a bulk matrix as for polymer particles produced from the same amount and type of reagents. Different possibilities for manipulating the matrix are described below for polymer particles, but these also apply to a bulk polymer (matrix). The pore sizes, the porosity and both the chemical and physical properties may differ from the bulk matrix with respect to the polymer particles when a combination of these types are used. Tailor-made matrixes (bulk and polymer particles) may be produced to give a controlled release of tracers and to control the permeability of different fluids.

The matrix may contain one or several types of porous or nonporous polymer particles of given diameters from $0.2\,\mu m$ to $5000\,\mu m$, preferentially $0.5\,\mu m$ to $3000\,\mu m$ and most preferentially $0.9\,\mu m$ to $1000\,\mu m$. Monodisperse or narrow sized particles may be produced by a two-step swelling method (EP0003905) or in a step growth process (EP0594696B1). The two step swelling method is suitable for producing monodisperse particles with sizes 1 μm to 1000 μm, while the step growth process is suitable for producing particles with sizes 100 μm to 1000 μm. Porous particles may be produced with a maximum pore volume of about 90 percent, but pore volumes higher than 70% will produce fragile particles not able to withstand large pressures at dry conditions. An optimum will be particles with about 50 to 70 percent free pore volume. A high degree of cross-linking in the particles will increase the amount of fine pores, and depending on the type of porogen, pores with a radius of about 50 nm to 200 nm are easily made. Larger pores are introduced by use of, for example, organic acids, alcohols, polymers or other degradable organic/inorganic composites.

Polymer particles may be produced by other polymerization techniques such as (but not limited to) dispersions, suspensions (oil/water), inverse suspensions, (water/oil), emulsions (mini- and micro emulsions) or by condensation reactions. However, most of these methods will give a wider size distribution of the polymer particles in the upper size range.

By mixing monodisperse or narrow sized particles of different given sizes, special types of matrixes with desired porosity and permeability can be made. Very accurate matrix packing structures may be made using monodisperse particles. Predetermined changes to porosity and permeability of the matrix due to given parameters like time, temperature, flow rate of oil, gas or water can be made.

The pores in matrix 8 are filled with an inert medium or compounds (porogen) after the polymerization process. Exposed to a desired medium (water or hydrocarbons), the porogen in the bulk matrix may be replaced by the well fluid. Porogen or compounds inside porous particles will dissolve at a slower rate providing a controlled change of free pore space and permeability of the matrix 8 in time.

Degradable small compact/ porous particles containing tracers may also be made and incorporated into the matrix. By degradation (like a soap piece) these particles will not create 'larger' holes in the matrix increasing porosity and permeability in time.

Degradable particles or gels present in the matrix may be made by soluble polymers bound together with cross linking which may be broken in time or exposed to, for example, water or oil. When these bonds are broken, the particles will be free to move with the fluid leaving open pores in the matrix.

Matrixes with different functional groups, such as (but not limited to): —NH$_2$, —OH, —COOH, —CONH$_2$, —SH, —COOR (R is any group), may be made by using monomers with specific chemical groups in addition to the monomers used for the polymerization reaction (described e.g. in EP0003905). By using given mixtures of different monomers, matrixes with different properties may be made containing given amounts of functional groups.

Active substances like microorganisms or any tracer for monitoring hydrocarbon and water production from different production zones/sections in a hydrocarbon reservoir and detection of different phenomena such as local variations in pH, salinity, hydrocarbon composition, temperature, pressure, microorganisms, and the difference between production of formation and/or injection water (described in Norwegian patent NO-C-309884) may be bound in the matrix 8 via degradable bonds, like but not limited to: esters, anhydride, carbonate and schiff bases, acting on specific events.

Functional groups, such as (but not limited to) —COOH, —OH, —CONH$_2$, —SO$_3$H, aromatic and aliphatic chains, may in addition be used in order to give the matrix 8 wanted wetting properties (hydrophobic and hydrophilic).

A predetermined decrease of matrix porosity and permeability can be obtained by using swelling polymer particles or gels inside the matrix 8. The swelling properties may be obtained by using polymer/monomers which can hydrolyse in the presence of water. In the hydrolysis or by other chemical processes, hydrophilic groups (such as, but not limited to, —COO$^-$, —SO$_3^-$ and —OH) are generated which gives increased solubility of polymers and swelling of particles/gels. If a cross-linked system is used, the degree of cross-linking will determine the degree of swelling of the matrix 8. A low degree of cross-linking will provide a large amount of swelling.

The principal for release of active substances or tracers is based on fine and medium sized pores in the matrix 8, giving strength and slow release of the active substance, as only a small part of the well fluid will pass through the matrix 8 due to the pore size. By intelligently incorporating tracers as part of the matrix 8 (described in Norwegian patent NO-C-309884) such as providing the tracer as part of the monomer unit(s), a controlled release of tracers without any decrease in matrix stability is ensured.

The matrix may comprise chemicals inhibiting or preventing any unwanted phenomena such as bacteria growth or scale formation in the matrix. A series of various chemicals can be immobilized in the matrix, and the chemicals are control-released or become active in response to given unwanted phenomena in the matrix. The purpose of these chemicals is to avoid blockage of pores and growth on pore-walls in the matrix due to unwanted phenomena such as growth of microorganisms or scale formation. The chemicals may be any suitable chemicals, preferentially working in low concentrations.

The microorganisms primarily responsible for troubles in hydrocarbon reservoirs are the sulphate reducing bacteria (SRB). These organisms are widely distributed and represent a specialized group of microorganisms that are able to reduce sulphate (SO$_4^{2-}$) to hydrogen sulphide (H$_2$S). The conditions for growth and activity of SRB in an offshore oil reservoir subjected to seawater flooding are good. The environment is anaerobic, the seawater contains significant amounts of sulphate and the formation of water and oil contains low molecular fatty acids as well as other nutrients. Thus, indigenous sulphate reducing bacteria (SRB) may colonize in the matrix and produce H$_2$S during growth. The H$_2$S may cause souring of the matrix and corrosion of the steel equipment, and the bacteria may produce biofilms (polysaccharides) that results in an unwanted plugging of pores in the matrix. Biocide treatments are today used extensively to control bacterial activity and corrosion in oil reservoirs and oil field systems. The toxic chemicals used include any convenient biocide (e.g. aldehydes, organic acids, isothiazolones, parabens, quaternary ammonium salts etc.).

Chemicals for biocide treatment immobilized in the matrix may be released or become active in response to certain triggers or SRB-metabolites. For example, the chemicals may be released or activated in response to sulphide, which is always generated during growth of microorganisms such as SRB, or in response to the lowering of pH that results from sulphite production. In this situation, the chemicals will be released only locally in regions with growth of SRB, while the chemicals in other regions remain latent and/or inactivated in the matrix. One possibility is to use magnetic iron (Fe) remanant particles that will coagulate and entrap or immobilize the chemical in its matrix. In response to sulphite ($S^{2-}$) the iron will precipitate as FeS, the matrix will degrade and the biocide will be released. Polymers with cross-linkages based on cystamine may also be used. In the presence of sulphite, the S—S-bond between two cystamine molecules will split and the active agent will be released.

As with respect to the release of active compounds in response to lowering of the pH level, various compounds or linkages that are labile at low pH can be utilized. Biocidal aldehydes that are linked to a matrix as a Shiffs base, will be released as a consequence of lowering of pH. Ester-linkages will also hydrolyze more effectively in acidic environments. Formation of biofilms, blocking pores in the matrix, may be prevented by coating the pore walls with lectins or antibodies against polysaccharides. Biofilm formed may be dissolved by use of enzymes, preferentially from marine thermopile microorganisms, that degrade polysaccharides in the biofilm. Immobilized microorganisms in the matrix with the ability to produce antimicrobial and/or growth restraining compounds, such as antibiotics and bacteriocines, may also be used. In this respect, genetic engineering may be used to design microorganisms with the ability to both grow and produce such compounds under reservoir conditions.

The matrix 8 may also be prefabricated onshore or offshore on any platform or ship by injecting a slurry containing given polymers and/or any polymer particles having desired properties, or containing any wanted chemicals or microorganism, initiators and an intern media (such as, but not limited to: stabilized reservoir oil) between the outer perforated tubular pipe system 6 and the inner screen 7. After polymerization, the matrix will have a given porosity and permeability. In cases where inert media is used, the pores in the matrix 8 made by the inert media will open up in time as the inert media is washed out or released at reservoir conditions.

The temperature stability of the matrix 8 varies on the monomers used in the polymerization process and may vary from 50° C. to 300° C. The physical strength of the bulk matrix or polymer particles (or combinations thereof making up the matrix 8) may be influenced by the pore sizes. Compact particles have high physical strength while macro porous particles with a high pore volume are influenced by pressure and friction/shear forces.

When the liner and matrix element system 4 does not work for fluid control of water or oil/gas, reservoir fluids and fine particles passing through the outer screen 6 will flow through the matrix 8 and inner screens 7 (and 16) without any significant pressure loss. Matrix 8 and inner screens 7 and 16 are not to work as filters for fine particles like sand. This is accomplished by larger openings in inner screen 7 and 16 than in outer screen 6 and/or by either a high porosity of matrix 8, but more preferably by holes or slices 10 through matrix 8 and inner screens 7 and 16. The holes or slices 10 through matrix 8 and inner screens 7 and 16 may be made by any suitable means and may be of any shape, size or quantity, but with larger open areas than holes or slices in screen 6. When matrix 8 swells due to, for example, absorption of water, the open areas through holes or slices 10 through matrix 8 will decrease giving higher resistance to fluid flow through the liner and matrix element system 4. In some cases before installation, the reservoir free space formed by holes or slices 10 may be filled with any desired inert medium or compound, making the liner and matrix element system 4 impermeable when introduced in a well.

Exposed to reservoir conditions, a desired medium (water or hydrocarbons), any desired chemical trigger, or over time, the inert medium may dissolve at a given rate increasing fluid cross flow through element 4. In this way, oil production rate can be delayed in time for given parts/sections of the production zone in an oil well.

Next will be considered the case when, in a production zone in a well, the main content of fluids and all fine particles passing through outer screen 6 flows through element 4 nearly without any restrictions. For measuring and/or control functions, a small portion of the fluids passing through outer screen 6 passes through matrix 8. Inside matrix 8, tracers may dissolve into the fluid according to the applicant's patent NO-C-309884. The fluid flow inside matrix 8 may also initiate any desired control functions by matrix 8. The fluid flow 14 through matrix 8 is due to pressure gradients caused by main fluid flow 13 through element 4, fluid flow 15 along element 4, shapes, sizes and quantities of holes or slices 10, and inner screens 7 and 16 as illustrated in FIGS. 6 and 7. For enhanced free flow of fluids 12 and any fine particles 11 through the element 4 and for protection of matrix 8 from, for example, any well tools and erosion due to fluid flow 15 and for preventing the fluid flow 15 from washing out the tracers from matrix 8 along its way out to the surface, the holes or slices 10 through matrix 8 may be coordinated with holes or slices in outer screen 6 and inner screens 7 and 16 as illustrated in FIGS. 6 and 7.

Fluid Control

Figure 8A:
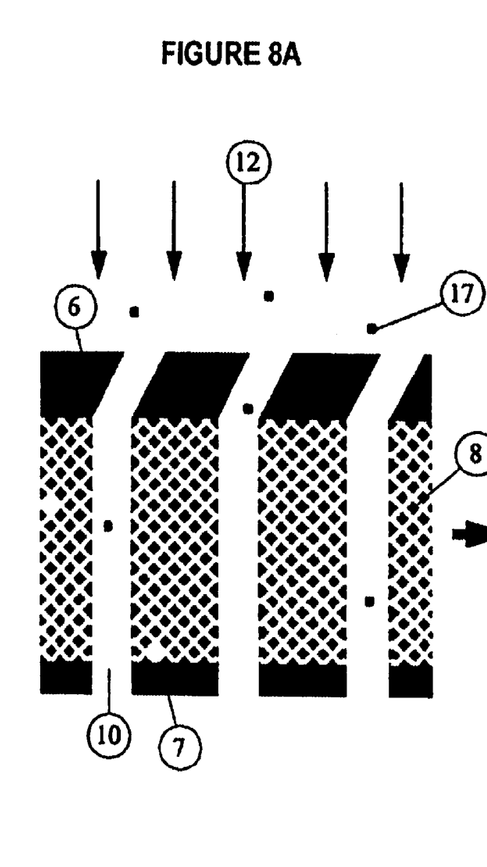
FIGS. 8A through 8C are schematic cross wall drawings of a possible design for a water control function using a combined liner and matrix element system according to an embodiment of the invention, by swelling of the matrix.
Figure 8B:
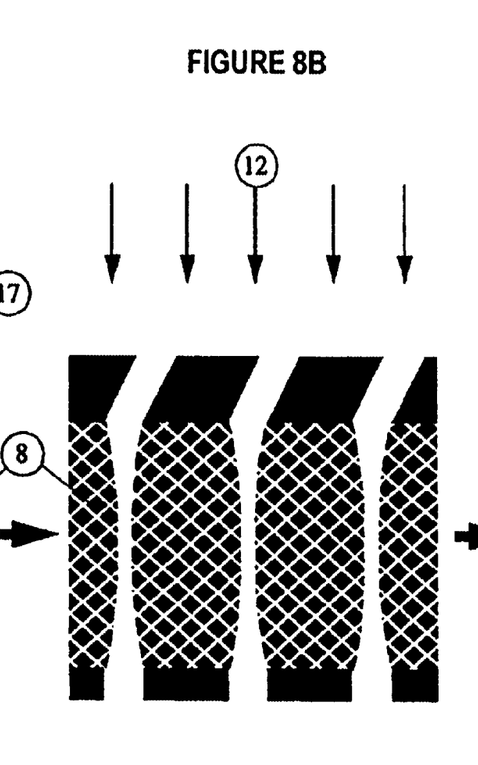
Figure 8C:
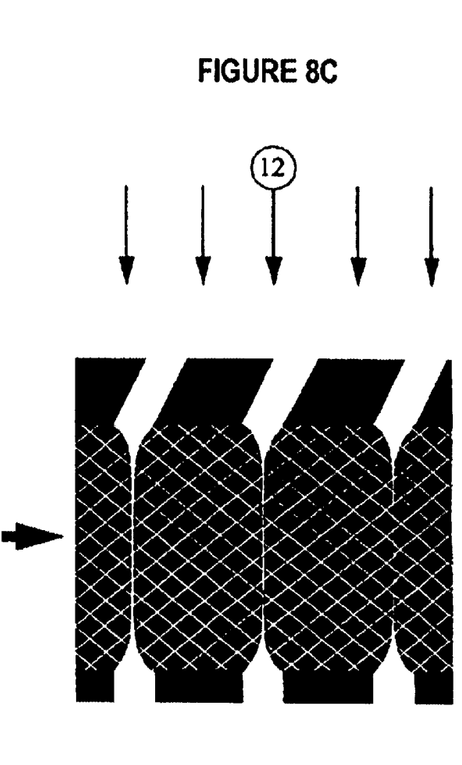

A possible design for a water control function using a combined liner and matrix element system 4 and swelling of matrix 8 is shown in FIG. 8. When matrix 8 is exposed to water fluid flow 12 for a given time, or triggered by any desired chemical trigger 17 (from, for example, any injection well), the matrix 8 swells as illustrated in FIGS. 8A through 8C. When matrix 8 swells, pores in the matrix and holes or slices 10 going through matrix 8 shrink, which results in decreases in free open areas in the matrix 8, thereby increasing the flow resistance to the fluid flow 12. The swelling of the matrix may be reversible according to the content of water or oil in the fluid flow 12, or may be permanent.

Figure 9A:
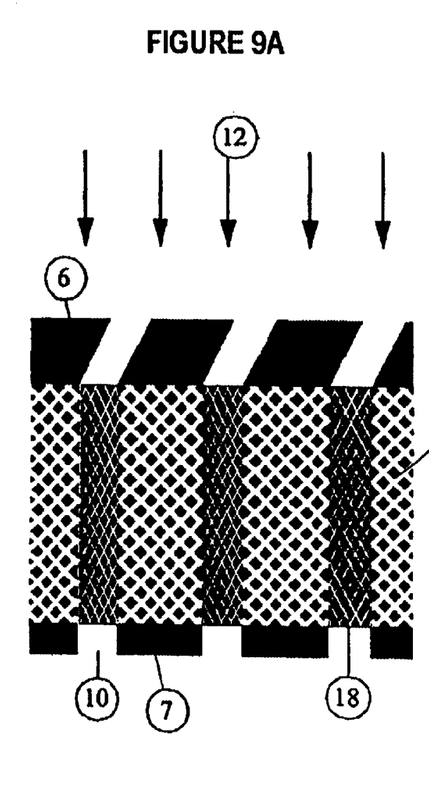
FIGS. 9A through 9C are schematic cross wall drawings of a possible design for a fluid flow control function using a combined liner and matrix element system according to an embodiment of the invention.
Figure 9B:
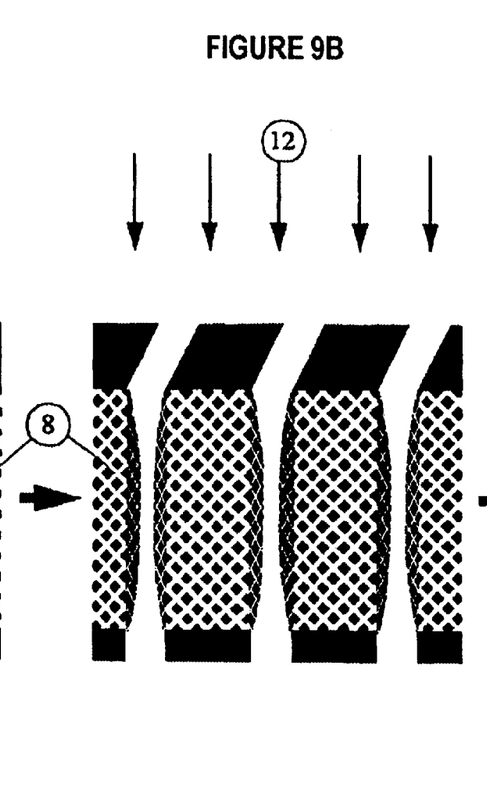
Figure 9C:
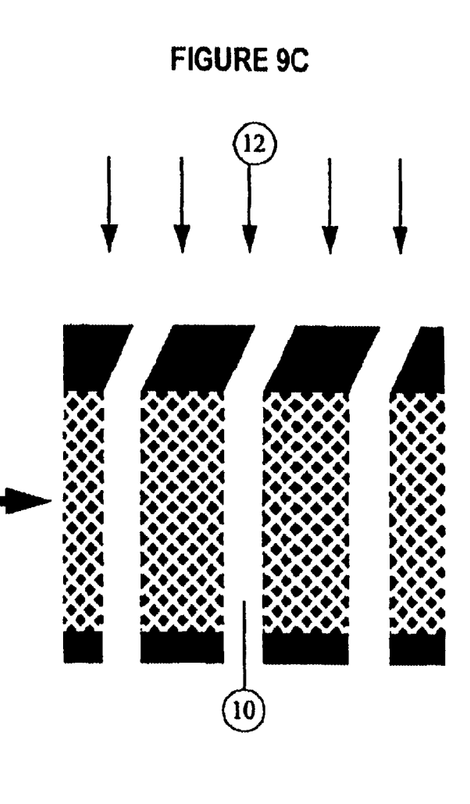

Another possible design for a fluid flow control function using a combined liner and matrix element system 4 is shown in FIG. 9. An inert medium 18 is filled into pores in matrix 8 and holes or slices 10 going through matrix 8 prior to installation of element 4 into a well 3. Exposed to reservoir conditions or triggered by any desired chemical trigger 17, the inert medium may be dissolved at a given rate, thereby opening up pores in matrix 8 and holes or slices 10 through matrix 8 as illustrated in FIGS. 9A through 9C.

Elements of the combined liner and matrix element system 4 may preferentially be prefabricated and tested onshore but may also be prefabricated and tested offshore on platforms or ships. It may also be made in one or several lengths and/or several outer and inner diameters. Mechanical strength, flexibility, physical and chemical properties of inner screens 7 and 16 and outer screen 6 and matrix 8 may be varied according to requirements. Properties of the matrixes 8 may vary at any length or circumference along the elements. The properties of the matrixes 8 may be predetermined from any reservoir data. In addition to a more or less permeable matrix 8 and holes or slices 10 through the matrix, the elements may contain parts of plain metal, polymer or composite material.

The elements 4 may be connected to each other, to other conventional liner pipes, or to any other kind of pipes (e.g.

production tubing) or equipment. Together with any other pipeline segments or equipment, the elements 4 may form a pipeline easily installed in horizontal, vertical or helical production or injection wells. The combined liner and matrix element system may preferentially be installed for a lifetime, or may be made suitable for retrieval and reinstallation of new elements.

In addition to the use in any kind of well bore onshore and/or offshore, a similar combined perforated pipeline matrix system may be used in any kind of process equipment (including, but not limited to: reactors, separators, storage tanks, etc.).

Based on reservoir data, a well bore may be divided into sections or zones that optimally should be operating separately in order to stop or restrict injection water from penetrating the hole well bore. Sealing of the well bore in sections or zones may be done by injection or squeezing of an impermeable matrix 5A in the free space between a liner 5B and the well bore 3. This is shown in FIG. 4. Components for this matrix 5A may be encapsulated inside the combined liner/matrix system elements 4 or squeezed throughout the screen 6 using suitable tools. Polymerization of the matrix 5A may be activated by remote control through any chemical, electrical, magnetic or mechanical means. In order to prevent matrix 5A from flowing away from a desired placement, end sections may be temporarily or permanently sealed off by any mechanical or chemical means.

Having described preferred embodiments of the invention, it will be apparent to those skilled in the art that other embodiments incorporating the concepts may be used. These and other examples of the invention illustrated above are intended by way of example only, and the actual scope of the invention is to be determined from the following claims.

What is claimed is:

1. A combined liner and matrix system comprising:
   an outer pipe liner to be installed in at least one of a well and a reservoir, said outer pipe liner having a first group of openings formed therein so as to be perforated;
   an inner screen; and
   a porous matrix between said outer pipe liner and said inner screen, a second group of openings being formed through said porous matrix and said inner screen, each of said second group of openings being larger than each of said first group of openings and larger than a pore size of said porous matrix so that said second group of openings allows free flow of fluid and fine particles that have passed through said first group of openings.

2. The system of claim 1, wherein said outer pipe liner comprises at least one of a flexible net and a single perforated pipe.

3. The system of claim 1, wherein said inner screen comprises at least one of a flexible net and a single perforated pipe.

4. The system of claim 1, wherein said outer pipe liner, said inner screen, and said porous matrix comprises at least one of a metal, an inorganic polymer, an organic polymer, and a composite material.

5. The system of claim 1, wherein said porous matrix has a controllable porosity, pore size and pore size distribution.

6. The system of claim 5, wherein said porous matrix is formed so that a porosity and permeability of said porous matrix is automatically controlled by at least one of a temperature of said porous matrix, a water flow into said porous matrix, an oil flow into said porous matrix, time, and contact between said porous matrix and a reagent.

7. The system of claim 5, wherein said porous matrix has 50% to 70% free pore volume.

8. The system of claim 1, wherein said porous matrix comprises at least one of a polymer and polymer particles.

9. The system of claim 8, wherein said porous matrix comprises polymer particles, each of sail polymer particles having a diameter of 0.2 $\mu$m to 5000 $\mu$m.

10. The system of claim 9, wherein each of said polymer particles has a diameter of 0.5 $\mu$m to 3000 $\mu$m.

11. The system of claim 10, wherein each of said polymer particles has a diameter of 0.9 $\mu$m to 1000 $\mu$m.

12. The system of claim 1, wherein said porous matrix is one of a group consisting of a bulk matrix having a shape of a geometrical volume of a polymer filling said porous matrix, a package of at least one type of polymer particle, and a combination of polymer particles in a bulk polymer.

13. The system of claim 1, wherein said porous matrix comprises one of a porogen medium and a porogen compound.

14. The system of claim 1, wherein said porous matrix includes one of a polymer and a chemical compound bonding substances to said porous matrix, said one of a polymer and a chemical compound being operable to react after installation so as to release the substances, thereby increasing a porosity of said porous matrix.

15. The system of claim 1, wherein said porous matrix includes components operable to be released from said porous matrix and detected after installation.

16. The system of claim 1, further comprising chemically intelligent tracers attached to said porous matrix for monitoring predetermined events after installation.

17. The system of claim 16, wherein said tracers are attached to said porous matrix by one of adsorption and chemical bonds.

18. The system of claim 1, wherein said porous matrix includes chemicals for inhibiting bacteria growth and scale formation.

19. The system of claim 1, further comprising a flexible perforated material arranged between said outer pipe liner and said inner screen, said flexible perforated material comprising at least one of a metal material, and inorganic polymer material, and an organic polymer material.

20. The system of claim 1, wherein each of said outer pipe liner, said inner screen, and said porous matrix is formed in interconnectable longitudinal sections for installation in the at least one of a well and a reservoir.

21. The system of claim 1, further comprising a sectional plugging mechanism for sealing interconnectable longitudinal sections of each of said outer pipe liner, said inner screen, and said porous matrix.

22. The system of claim 1, wherein each of said outer pipe liner, said inner screen, and said porous matrix is formed in interconnectable longitudinal sections, each of said sections of said porous matrix having different properties.

23. A method of controlling and monitoring processes in one of a well and a reservoir, comprising:
   providing a combined liner and matrix system including:
      an outer pipe liner to be installed in the one of a well and a reservoir, the outer pipe liner having a first group of openings formed therein so as to be perforated;
      an inner screen; and
      a porous matrix between the outer pipe liner and the inner screen, a second group of openings being formed through the porous matrix and the inner screen, each of the second group of openings being larger than each of the first group of openings and larger than a pore size of the porous matrix so that the second group of openings allows free flow of fluid and fine particles having passed through the first group of openings;

collecting data from the one of a well and a reservoir;

providing the porous matrix with properties based on the collected data from the one of a well and a reservoir;

installing the combined liner and matrix system in the one of a well and a reservoir; and monitoring the one of a well and a reservoir using the properties of the porous matrix so as to control the one of a well and a reservoir.

24. The method of claim 23, wherein said providing the porous matrix with properties comprises attaching chemically intelligent tracers to the porous matrix based on the collected data, wherein the tracers are released from the porous matrix after predetermined events occur in the one of a well and a reservoir.

25. The method of claim 24, wherein said attaching the chemically intelligent tracers comprises attaching the tracers to the porous matrix by one of adsorption and chemical bonding.

* * * * *